United States Patent Office 2,721,378
Patented Oct. 25, 1955

2,721,378

PROCESS FOR MANUFACTURE OF POROUS STRUCTURE

Donald Arthur Oliver, Sheffield, and Sydney Charles Wilsdon, Olton, England, assignors to The Birmingham Small Arms Company Limited, Birmingham, England, a British company No Drawing. Application June 11, 1951, Serial No. 231,068

6 Claims. (Cl. 29—420)

This invention relates to the production of porous metallic plates from powder metals and is particularly, but not exclusively, concerned with the manufacture of filter or porous plates for use in the chemical and plastics industries or for transpiration cooling purposes.

The production of porous plates per se by powder metallurgical methods is known and does not present serious difficulties. However the size of plate which can be produced is limited by such items as compacting press size, furnace size and the inherent strength of the finished article. Consequently, where the effective area required is larger than the area of the maximum size of plate which can be made under given conditions, the problem of securing several plates together to form the larger area arises. Mounting them in a frame is a difficult and expensive matter as, for filtration purposes at least, fluid tight joints must be secured between the frame and the plates. The welding of the plates together appeals as a simple solution of the problem, but we have found that plates of a degree of porosity such as is required for filtration purposes made by the normal method of compacting and then sintering metal powder cannot be satisfactorily welded together by known welding methods; invariably cracks occur at the base of the weld.

It is one of the objects of this invention to provide a unitary structure comprising an assembly of porous plates, made by powder metallurgical methods, which are welded together by known welding methods.

According to this invention a process for the manufacture of a unitary structure from an assembly of porous metal plates comprises the welding together of porous metal plates each of which has been made by compacting and sintering metal powder in the usual manner to give a porous plate and then re-pressing the plate and re-sintering it.

As the invention is particularly concerned with the production of unitary structures for use as filters, the use of stainless steel powder in carrying out the invention is preferred in view of the increased resistance to corrosion which the finished filter possesses in comparison with, say, filters made from iron powders.

The initial compacting and sintering may be carried out with a compacting pressure which is within the range 5–35 tons per square inch and with a sintering temperature which is within the range 1150° C.–1300° C. for about an hour.

The re-pressing is preferably carried out at a pressure which is upwards of 2.5 tons per square inch and the re-sintering at a temperature which is within the range 1150° C.–1300° C.

The particle size of the metal powder is preferably as uniform as possible, since this uniformity is reflected in the uniformity of the permeability of the final porous plate. Powders passing through a 30 mesh sieve but retained on a 300 mesh sieve have been found to be generally suitable but, where a greater degree of uniformity is desired, powders passing through a 100 mesh sieve but retained on a 300 mesh sieve are preferred.

Welding together of the porous plates is preferably carried out by the argon arc or atomic hydrogen arc methods.

As an example of one method of carrying out the invention stainless steel powder containing 15% ammonium bicarbonate was compacted at 10 tons per square inch, and was then sintered in a non-oxidizing atmosphere (consisting of 75% hydrogen and 25% nitrogen) at 1150° C. for one hour in order to produce a porous plate. The resultant porous plate had a flow rate therethrough of 215 cubic feet per minute per square foot per $\frac{1}{8}''$ of plate thickness under a pressure of 1 lb. per square inch. The ultimate tensile stress was 2.18 tons per square inch. Attempts to weld the edges of two such plates together were unsuccessful. Each plate was then returned to the compacting die and re-pressed at 5 tons per square inch and re-sintered as before at 1300° C. for one hour. Each resultant porous plate had a flow rate corresponding to that previously mentioned of 155 cubic feet per minute and ultimate tensile stress was 6.10 tons per square inch. The two plates were then butt-welded without difficulty by argon arc or atomic hydrogen arc methods.

In a further example stainless steel powder containing 15% ammonium bicarbonate was compacted at 10 tons per square inch, and was then sintered in a non-oxidizing atmosphere (consisting of 75% hydrogen and 25% nitrogen) at 1150° C. for one hour in order to produce a porous plate. The resultant porous plate had a flow rate (as above defined) of 148 cubic feet per minute and an utimate tensile stress of 2.1 tons per square inch. Attempts to weld the edges of two such plates were unsuccessful. Each plate was then returned to the compacting die and re-pressed at 10 tons per square inch and re-sintered as before at 1300° C. for one hour. Each resultant porous plate had a flow rate of 75.2 cubic feet per minute and the ultimate tensile stress was 9.2 tons per square inch. The two plates were then butt-welded without difficulty by argon arc or atomic hydrogen arc methods.

According to an alternative form of this invention re-pressing may be effected on a part or parts only of the porous plate, for example, for a short distance at and towards the edges. For example, a strip of about $\frac{1}{4}''$ around the edges of a porous plate is re-pressed. The amount of re-pressing may gradually decrease from the edge towards the centre of the plate. This may be conveniently achieved by the formation of an appropriate taper in the re-pressing die. Alternatively the original mould may be so designed that the article may gradually thicken towards its edges. On re-pressing, the edges are arranged to be compressed to give an article of substantially uniform thickness but with a strengthened portion at and towards its edges.

In any of the forms of this invention strengthened metal such as, for example, wire gauze, may be incorporated.

It will be appreciated that the majority of articles made by powder metallurgy are "porous" to the extent that they usually have pores to a greater or lesser degree. It will be understood that this invention relates only to those articles which are so porous that normally they could not readily be welded together.

According to a feature of this invention the porous plates may be chromized prior to the re-pressing operation or, alternatively, subsequent to the re-sintering operation.

By "chromizing" is meant the diffusion of chromium into the surface of the article. This may be achieved by treating the article at an elevated temperature with gaseous chromium or a suitable gaseous chromium compound, particularly a halide of chromium. Details of"

chromizing processes are given in the "Report on Investigation of Methods of Gaseous Metal Treatment" issued by the British Intelligence Objectives Sub-Committee (B. I. O. S. Final Report No. 389).

The effect of chromizing is to increase further the tensile strength which renders the articles less susceptible to cracking at the joints when welded together.

Having thus described our invention, what we claim as new and desire to secure by Letters Patent is:

1. A process for the manufacture of a unitary porous structure, which comprises forming porous metal filter plates by initially compacting and sintering a stainless alloy steel powder, the compacting being effected over the entire plate within a pressure range of 5 to 35 tons per square inch, subjecting portions of the plates adjacent the edges thereof to re-pressing at a pressure of at least 2.5 tons per square inch followed by re-sintering to thereby densify and strengthen said portions of the plate while leaving substantially unaffected the permeability of the plate portions not subjected to re-pressing, and uniting an assembly of such plates by welding together the densified and strengthened portions thereof.

2. A process as defined in claim 1, wherein the initial sintering is effected at a temperature of between 1150° C. and 1300° C. for a period of about one hour.

3. A process as defined in claim 1, wherein the re-sintering is effected at a temperature of between 1150° C. and 1300° C. for a period of about one hour.

4. A process as defined in claim 1, wherein the amount of re-pressing pressure decreases gradually from the edges of the plate inwardly therefrom.

5. A process as defined in claim 1, including the step of chromizing the plates prior to re-pressing.

6. A process as defined in claim 1, including the step of chromizing the plates subsequent to re-sintering.

References Cited in the file of this patent
UNITED STATES PATENTS

| | | |
|---|---|---|
| 2,133,761 | Tietig | Oct. 18, 1938 |
| 2,220,641 | Davis | Nov. 5, 1940 |
| 2,267,918 | Hildabolt | Dec. 30, 1941 |
| 2,287,951 | Tormyn | June 30, 1942 |
| 2,315,302 | Volterra | Mar. 30, 1943 |
| 2,359,401 | Wulf | Oct. 3, 1944 |
| 2,397,831 | Bellamy | Apr. 2, 1946 |
| 2,401,483 | Hensel | June 4, 1946 |
| 2,409,295 | Marvin | Oct. 15, 1946 |
| 2,431,690 | Hull | Dec. 2, 1947 |
| 2,456,779 | Goetzel | Dec. 21, 1948 |
| 2,464,517 | Kurtz | Mar. 15, 1949 |
| 2,554,343 | Pall | May 22, 1951 |